US012611790B1

(12) United States Patent
Warmus, Sr.

(10) Patent No.: US 12,611,790 B1
(45) Date of Patent: Apr. 28, 2026

(54) ROTATING SHAVING RAZOR APPARATUS

(71) Applicant: Daniel J. Warmus, Sr., Grand Isalnd, NY (US)

(72) Inventor: Daniel J. Warmus, Sr., Grand Isalnd, NY (US)

( * ) Notice: Subject to any disclaimer, the term of this patent is extended or adjusted under 35 U.S.C. 154(b) by 0 days.

(21) Appl. No.: 19/322,218

(22) Filed: Sep. 8, 2025

Related U.S. Application Data

(60) Provisional application No. 63/712,450, filed on Oct. 26, 2024.

(51) Int. Cl.
*B26B 21/52* (2006.01)

(52) U.S. Cl.
CPC .................................... *B26B 21/52* (2013.01)

(58) Field of Classification Search
CPC ..... B26B 21/52; B26B 21/521; B26B 21/522; B26B 21/523; B26B 21/527; B26B 21/40
USPC ...................................... 30/526–536; D28/48
See application file for complete search history.

(56) References Cited

U.S. PATENT DOCUMENTS 360,159 A * 3/1887 Keating .................. B26B 21/52 30/83
489,995 A * 1/1893 Stenberg ................. B26B 19/14 30/527
756,615 A * 4/1904 Fornander ............... B26B 21/52 30/527
944,989 A * 12/1909 Edmonds ................ B26B 21/18 30/526
1,390,277 A * 9/1921 Davidson ................ B26B 21/10 30/531
1,500,165 A * 7/1924 Thorpe ................... B26B 21/16 30/527
2,342,291 A * 2/1944 Morelli ................... B26B 21/00 30/51
2,560,004 A * 7/1951 Shannon ................. B26B 21/18 30/527
2,748,470 A 6/1956 Borden
(Continued)

FOREIGN PATENT DOCUMENTS

CA 2717671 A1 * 4/2012 ........... B26B 21/523
CN 119458474 A * 2/2025 ............. B26B 21/52
(Continued)

*Primary Examiner* — Jason Daniel Prone
(74) *Attorney, Agent, or Firm* — Law Office of Vincent LoTempio, PLLC; Vincent G. LoTempio; Robert L. Cerasa

(57) ABSTRACT

A shaving razor apparatus having a handle with a blade-carrying head at one end and a rotary assembly at the opposite end. The rotary assembly enables controlled pivoting of the handle and head in response to pressure. It includes a pivot rod retained transversely within a channel in the handle, along with securing members and grip portions that stabilize and assist manual adjustment. A spring biasing member provides rotational resistance and recoil bias during use. In the primary embodiment, the spring comprises a torsion coil and extended arm retained under preload tension by a catch at the distal end of the handle. Alternative embodiments may utilize elastic springs or leverage gravitational force to achieve similar biasing effects. The design enables ergonomic control and dynamic blade positioning, with modular components that allow for varied resistance profiles and interchangeable biasing elements.

18 Claims, 14 Drawing Sheets

(56) References Cited

U.S. PATENT DOCUMENTS

| | | | | | |
|---|---|---|---|---|---|
| 2,848,806 | A * | 8/1958 | Shnitzler et al. | B26B 21/32 | 30/526 |
| 4,461,078 | A * | 7/1984 | Carreker | B26B 21/523 | 30/526 |
| 4,638,560 | A * | 1/1987 | Higashi | B26B 21/523 | 30/47 |
| 4,879,811 | A | 11/1989 | Cooney | | |
| 5,010,645 | A * | 4/1991 | Furukawa | B26B 21/523 | 30/47 |
| 5,167,069 | A | 12/1992 | Quinn | | |
| 5,784,785 | A * | 7/1998 | Polites | B26B 21/523 | 30/528 |
| 6,189,222 | B1 * | 2/2001 | Doyle | B26B 21/523 | 30/526 |
| 7,000,282 | B2 * | 2/2006 | Cox | B25G 1/06 | 16/430 |
| 7,093,363 | B1 * | 8/2006 | Kuo | B26B 21/521 | 30/535 |
| 7,103,980 | B2 * | 9/2006 | Leventhal | B26B 19/00 | 30/526 |
| 7,140,115 | B2 * | 11/2006 | Greene | B26B 21/527 | 30/526 |
| D603,096 | S * | 10/2009 | Greene | D28/48 | |
| D605,362 | S * | 12/2009 | Andersen | D28/48 | |
| D611,653 | S * | 3/2010 | Marut | D28/46 | |
| 7,856,725 | B2 * | 12/2010 | Marut | B26B 21/523 | 30/527 |
| D659,904 | S * | 5/2012 | Gilbert | D28/48 | |
| D664,297 | S * | 7/2012 | Prat-Pfister | D28/48 | |
| D667,168 | S * | 9/2012 | Greene | D28/48 | |
| D676,197 | S * | 2/2013 | Boulanger | D28/48 | |
| 8,782,911 | B1 * | 7/2014 | Greene | B26B 21/52 | 30/526 |
| 9,144,912 | B2 * | 9/2015 | Marut | B26B 19/386 | |
| 9,308,658 | B2 * | 4/2016 | Coviello | B26B 21/523 | |
| 9,604,376 | B2 * | 3/2017 | Sacks | B26B 21/523 | |
| 9,701,034 | B2 | 7/2017 | Papadopoulos-Papageorgis et al. | | |
| 9,713,879 | B2 * | 7/2017 | Samuels | B26B 21/523 | |
| D808,589 | S * | 1/2018 | Dryfhout | D28/48 | |
| 10,926,426 | B2 * | 2/2021 | Psimadas | B26B 21/521 | |
| 11,148,310 | B2 * | 10/2021 | Maimone | B26B 21/521 | |
| 11,312,034 | B2 * | 4/2022 | Pereyra | B26B 21/52 | |
| 11,351,685 | B2 * | 6/2022 | Franklin | B26B 19/063 | |
| D1,046,292 | S * | 10/2024 | Marut | D28/48 | |
| 2003/0177648 | A1 * | 9/2003 | Zeiter | B26B 21/523 | 30/526 |
| 2004/0107585 | A1 * | 6/2004 | Helmrich | B26B 21/523 | 30/526 |
| 2011/0252646 | A1 * | 10/2011 | Gordon | B26B 21/52 | 30/527 |
| 2015/0266191 | A1 * | 9/2015 | Maimone | B26B 21/52 | 30/527 |
| 2017/0282392 | A1 * | 10/2017 | Maimone | B26B 21/52 | |
| 2020/0338768 | A1 * | 10/2020 | Dixon | B26B 21/522 | |
| 2021/0221013 | A1 * | 7/2021 | Duvall | B26B 21/521 | |
| 2025/0083349 | A1 * | 3/2025 | Lindén | B26B 21/523 | |

FOREIGN PATENT DOCUMENTS

| | | | | |
|---|---|---|---|---|
| DE | 479817 | C * | 7/1929 | B26B 21/52 |
| DE | 29621890 | U1 * | 4/1997 | B26B 21/523 |
| DE | 102005012880 | A1 * | 9/2006 | B26B 21/523 |
| DE | 202015002314 | U1 * | 7/2015 | B26B 21/523 |
| GB | 2268434 | A | 1/1994 | |
| GB | 2360479 | A | 9/2001 | |
| KR | 100855647 | B1 * | 9/2008 | B26B 21/523 |
| SE | 2230314 | A1 * | 9/2023 | B26B 21/523 |
| WO | WO-2024027493 | A1 * | 2/2024 | B26B 21/52 |

* cited by examiner

ROTATING SHAVING RAZOR APPARATUS

CROSS REFERENCE TO RELATED APPLICATION

This application claims the benefit of United States Provisional Application of Daniel J. Warmus, Sr. application No. 63/712,450, filed Oct. 26, 2024, having the title for A ROTATING SHAVING RAZOR APPARATUS, which is incorporated herein by reference in its entirety.

FIELD OF THE DISCLOSURE

This disclosure relates to a rotating shaving razor apparatus with rotary assembly designed to provide movement flexibility.

BACKGROUND

Existing safety razors, cartridge razors and disposable razors typically consist of a handle with a pivoting razor blade cartridge mounted at one end. Conventional razor designs incorporate a single pivot point between the handle and blade cartridge, allowing only limited rotation of approximately 10-15 degrees. This limited pivoting action forces the user to cantilever the handle to approximately 30 degrees for optimal performance. This restricted movement constrains the razor's ability to maintain optimal blade contact with the skin across varying facial and body contours, often resulting in uneven pressure distribution, skin drag, and potential irritation during shaving. The limited articulation also necessitates frequent repositioning of the razor when transitioning between different areas of the body.

A common disadvantage of these traditional razors is the limited rotational movement of the handle, which requires the user to utilize the pivot points of their wrist, elbow and shoulder to position the razor close to the area being shaved. The restricted pivoting of the blade cartridge, mounted at one end of conventional razor handles, hinders effective positioning on different parts of the body. For example, shaving often poses a challenge for young women, who, due to their inexperience, find it difficult to shave intimate areas of the female body.

Similarly, men encounter difficulty when moving the blade from the lower face to the neck, as they need to reposition the handle to achieve an upward stroke. What is needed to overcome this problem is a razor with a shaving blade and a rotating handle that allows for a smooth, continuous stroke from the face to under the neck. This design would minimize the need to reposition the handle and reduce the risk of cuts by enabling users to shave at different angles while maintaining control over the pressure applied to the skin and positioning of the razor blade cartridge.

Additionally, conventional shaving razors having an elongated handle require users to cradle the razors in the palm of their hand and grip using four fingers and a thumb to support the razor during the shaving process. Elongated handles make it harder to maneuver razors in hard-to-reach and tight spaces, decreasing precision and often requiring increased pressure in order to accommodate. Such increased pressure can lead to unnecessary nicks, cuts, and razor burns.

Some attempts have been made to improve razor flexibility through various mechanisms. For example, certain razors incorporate spring-mounted blade systems or magnetic positioning elements to enhance blade contact with the skin. Other designs have explored multiple blade units positioned on articulated arms to follow facial contours. However, these approaches still maintain the fundamental limitation of a fixed handle-to-blade relationship that restricts the natural movement of the hand during the shaving process.

The challenge remains to develop a shaving razor that provides enhanced freedom of movement while maintaining precise control over blade positioning and pressure. An improved razor design would ideally allow for continuous, smooth strokes across varying facial and body contours without requiring awkward hand positions or frequent razor repositioning. Additionally, such a design would need to accommodate the natural biomechanics of hand movement during the shaving process while ensuring consistent blade-to-skin contact for effective hair removal.

Thus, there is a long felt need to improve the design of razors to enhance the pivoting capability of such razors and to simplify the design and the manufacturing. Thus, a heretofore unaddressed need exists in the industry to address the aforementioned deficiencies and inadequacies.

SUMMARY

Although illustrative embodiments of one or more aspects are provided herein, the disclosed processes may be implemented using any number of techniques. The disclosure is not limited to the illustrative or specific embodiments, any drawings, and any techniques illustrated herein, including any exemplary designs and embodiments illustrated and described herein, and may be modified within the scope of the appended claims along with their full scope of equivalents.

The present disclosure relates to a rotating shaving razor apparatus that provides enhanced flexibility and maneuverability during shaving operations. The rotating shaving razor apparatus addresses limitations of conventional razors by incorporating a rotary assembly that enables increased pivoting capability and improved adaptation to various contours of the shaving surface. The present disclosure provides for an improved rotating shaving razor apparatus.

Briefly described, in architecture, one embodiment of the rotating shaving razor apparatus comprising: a handle with a proximal end and a distal end. At the distal end of the A rotary assembly is positioned near the proximal end of the handle, which includes a pivot rod having a first lateral end, a second lateral end, and a medial section. The pivot rod is rotatably mounted perpendicular to the handle, with a first holding member secured to the first lateral end and a second holding member secured to the second lateral end. This configuration allows the handle to pivot about the stationary pivot rod, enabling elevation and depression of the handle and the blade-carrying head during shaving. Alternatively, the pivot rod may be integrally molded with the handle, where the holding members are rotatably connected at the lateral ends of the pivot rod. In this configuration, the holding members remain stationary while the pivot rod and the handle together rotate about the pivot axis.

A general objective of the present disclosure is to provide a rotating shaving razor apparatus designed with a compact, non-elongated handle that offers enhanced freedom of movement compared to conventional razors with elongated handles.

Another object of the present disclosure is to provide a rotating shaving razor apparatus with a shaving blade and a rotating handle that allows for a smooth, continuous stroke from the face to under the neck.

In another aspect of the present disclosure, the rotary assembly includes a recoil mechanism positioned along the lower surface of the handle and operatively connected to the medial section of the pivot rod. This configuration allows the handle and blade assembly to return to a neutral orientation and promotes easy lift-off from the skin surface, improving ergonomic responsiveness and control.

Still a further object of the present disclosure is to provide a recoiling means using a spring, elastic band, or gravitational force to facilitate counteraction of forward bias pressure exerted by the user's index finger during shaving operations.

Another objective of the present disclosure is to provide a rotating shaving razor apparatus that offers a 20% to 30% increase in handle movement flexibility, a 25% improvement in cartridge accessibility to the shaving surface, and a reduction in raw material usage by approximately 20% to 40%.

Another objective of the present disclosure is to provide a rotating shaving razor apparatus that enables operation with only two fingers and the thumb, enhancing hand mobility during shaving.

Still another objective of the present disclosure is to offer a rotating shaving razor apparatus that allows the blade to glide smoothly over skin contours regardless of surface shape, providing a smooth, continuous stroke from face to neck without repositioning.

Other systems, devices, apparatuses, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The present disclosure and the manner in which it may be practiced is further illustrated with reference to the accompanying drawings wherein.

DETAILED DESCRIPTION OF THE EMBODIMENTS

Figure 1A:
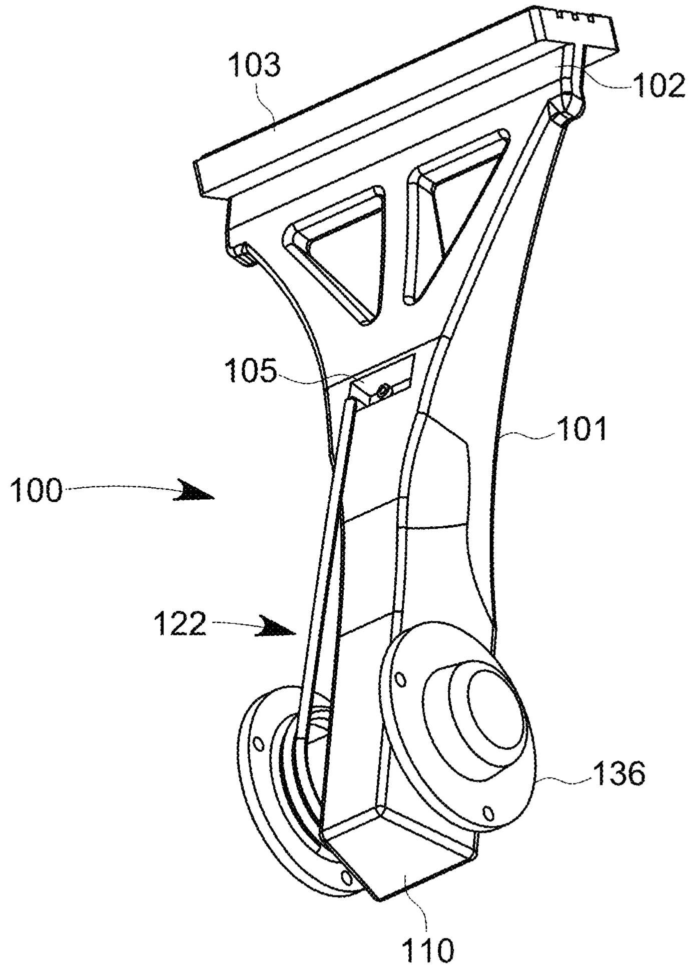
FIG. 1A illustrates a perspective view of the rotating shaving razor apparatus, according to one embodiment of the present disclosure.

Reference is now made in detail to the description of the embodiments as illustrated in the drawings. While several embodiments are described in the connection with these drawings, there is no intent to limit the disclosure to the embodiment or embodiments disclosed herein. On the contrary, the intent is to cover all alternatives, modifications, and equivalents.

It should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this disclosure as required by 35 U.S.C. § 112.

Typically, traditional handheld shaving razors are cradled in the palm and gripped using four fingers and a thumb to support the razor during the shaving process. The disclosed rotating shaving razor apparatus allows the user to shave using two fingers and the thumb, allowing for greater freedom of hand movement. Traditional handheld shaving razors usually have one pivoting point at the razor cartridge, with the cartridge pivoting approximately 10 to 15 degrees during shaving. This limited razor cartridge pivoting action forces the user to angle the handle to about 30 degrees for optimal performance.

In contrast, the preferred embodiment of disclosed rotating shaving razor apparatus employs an additional pivot point in the handle, increasing the cartridge's pivoting motion by approximately 20 to 30 degrees. This added pivoting motion enhances smoother movement and reduces drag and abrasion on the shaving surface. The handle pivoting point consists of a rotary assembly designed to allow the razor handle to move freely during shaving. This handle pivoting point flexibility enables the blade to glide effortlessly over the skin, regardless of the contour of the shaving surface. Additionally, the disclosed rotating shaving razor apparatus can be used in an inverted position, enhancing a smoother movement and less drag/abrasion on the shaving surface.

A comparative analysis between the present disclosure versus popular retail shaving razors demonstrates that the rotating shaving razor apparatus of this disclosure achieves a significantly greater percentage reduction in both weight and length, as detailed in Table 1 (below). Specifically, the instant rotating shaving razor apparatus shows an average weight reduction of approximately 39% in the handle as compared to the full assembly of other models. A similar advantage is observed in length reduction, where this apparatus is shortened approximately 40% in the handle.

TABLE 1

| MODEL | Weight Reduction % (Full Assembly) | Weight Reduction % (Handle Only) | Length Reduction % (Full Assembly) | Length Reduction % (Handle Only) |
|---|---|---|---|---|
| BIC SOLEIL ESCAPE | 38% | 47% | 45% | 47% |
| BIC FLEX 5 | 36% | 33% | 36% | 39% |
| BIC EASY RINSE | 38% | 33% | 37% | 37% |
| BIC SOLEIL SIMPLY SMOOTH | 44% | 44% | 37% | 37% |

The rotary assembly allows the handle of the razor the flexibility to move freely during the shaving process in an upright or inverted position. This flexibility allows the cartridge to glide effortlessly over the skin surface regardless of contour of the shaving surface.

Thus the present disclosure provides a razor with a shaving blade and a rotating handle that allows for a smooth, continuous stroke from the face to under the neck. The present disclosure provides for a rotating shaving razor apparatus featuring a compact, non-elongated handle that delivers greater freedom of movement than conventional razors with elongated handles. By forgoing the traditional extended handle configuration, the apparatus enhances maneuverability and ergonomic control, supporting more precise shaving angles and improving user comfort, particularly in hard-to-access areas. The compact, non-elongated handle eliminates the need for hand repositioning and reduces the likelihood of cuts by allowing users to shave effectively at varying angles while maintaining control over both applied pressure and blade cartridge positioning.

The preferred embodiment of the present disclosure includes a rotating shaving razor apparatus comprising: a handle having a proximal end and a distal end; a blade-carrying head disposed at the distal end of the handle; a rotary assembly positioned near the proximal end of the handle, the rotary assembly including: a pivot rod having a first lateral end, a second lateral end, and a medial section, the medial section rotatably mounted in a transverse orientation relative to a rotational longitudinal axis of the handle for biasing elevation and depression of the handle and the blade-carrying head; a first securing member coupled to the first lateral end of the pivot rod and a second securing member coupled to the second lateral end of the pivot rod; wherein the first and second securing members engage opposing ends of the pivot rod and retain the pivot rod in a fixed axial position during rotational movement of the handle; and wherein the pivot rod permits angular displacement of the handle about its rotational longitudinal axis, thereby enabling elevation and depression of the handle and the blade-carrying head during shaving.

Averting now to the drawings, FIG. 1A illustrates a perspective view of the rotating shaving razor apparatus 100, according to one embodiment of the present disclosure. As an embodiment, a rotating shaving razor apparatus 100 comprises a handle 101 having a proximal end 110 and a distal end 102. The handle is a shaft which is compact and ergonomically designed to be comfortably gripped by a user during shaving operations. The handle may be constructed from various materials including but not limited to plastic, metal, rubber, or combinations thereof to provide durability while maintaining a lightweight feel. The handle may have a length ranging between approximately 4.0 inches and 6.0 inches, with a preferred length of approximately 5.0 inches.

A rotary assembly 120 is situated adjacent to the proximal end 110 of the handle 101. This rotary assembly functions as a pivot mechanism, enabling rotational movement of the handle in response to applied pressure during operation. The rotary assembly 120 includes a pivot rod 134 having a first lateral end, a second lateral end, and a medial section. The medial section is retained within a channel formed in the handle 101 in a transverse orientation relative to a rotational longitudinal axis of the handle, thereby defining a pivot axis about which the handle rotates. The assembly further includes a pair of securing members 136, a pair of grips 132, and a spring biasing member, referred to generally as spring 122 operatively associated with a catch 105 and provides rotational resistance and recoil bias during pivoting of the handle 101. In the disclosed embodiment, the spring 122 is a torsion spring comprising a coil portion 123 and an extended arm portion 121. The coil portion 123 is positioned in compression between the handle and either the first securing member or the second securing member. The extended arm such that the coil portion remains stationary relative to the securing members while the handle rotates.

The extended arm portion is retained under tension by the catch 105, which comprises a retention notch or recessed groove formed at the distal end of the handle 101. Alternatively, the spring 122 may consist of a torsion spring having an extended arm wire embedded within the handle 101, passing through an aperture in the pivot rod 134 to connect to the two securing members 136, thereby providing similar biasing functionality.

Although the disclosed embodiment utilizes a torsion spring comprising a coil portion 123 and an extended arm portion 121, other biasing elements may be employed to achieve similar functionality. Suitable alternatives include coil springs, compression springs, leaf springs, or elastomeric components positioned to generate resistance during pivot and facilitate return motion. The catch 105 consists of a retention notch or recessed groove formed in the handle 101 that receives and holds the extended arm portion of the torsion spring under preload tension during use.

The pivot rod 134 is rotatably mounted perpendicular to the handle, creating a pivot point around which the handle can rotate. The pivot rod may be constructed from metal, high-strength plastic, or other durable materials capable of withstanding repeated rotational forces.

Figure 1B:
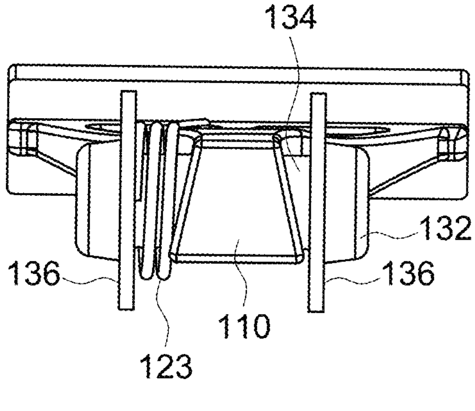
FIG. 1B illustrates a bottom view of the shaving razor apparatus, according to one embodiment of the present disclosure.

FIG. 1B presents a bottom view of the shaving razor apparatus, highlighting the proximal end 110 of handle 101, in accordance with one embodiment of the present disclosure. The handle may feature a textured surface or rubberized sections to minimize slippage during use, especially when wet. In this embodiment, each securing member 136 includes a grip 132, which is depicted as a circular cap, though the grip may take any shape and/or be coated with rubber or similar material to enhance grip 132. The securing members 136 are positioned at first lateral end 131 and second lateral end 133 of the pivot rod 134, securing the pivot rod within channel 106. The holding members also function to keep the pivot rod stationary during shaving, thereby allowing the handle 101 to rotate about the pivot rod 134.

Figure 1C:
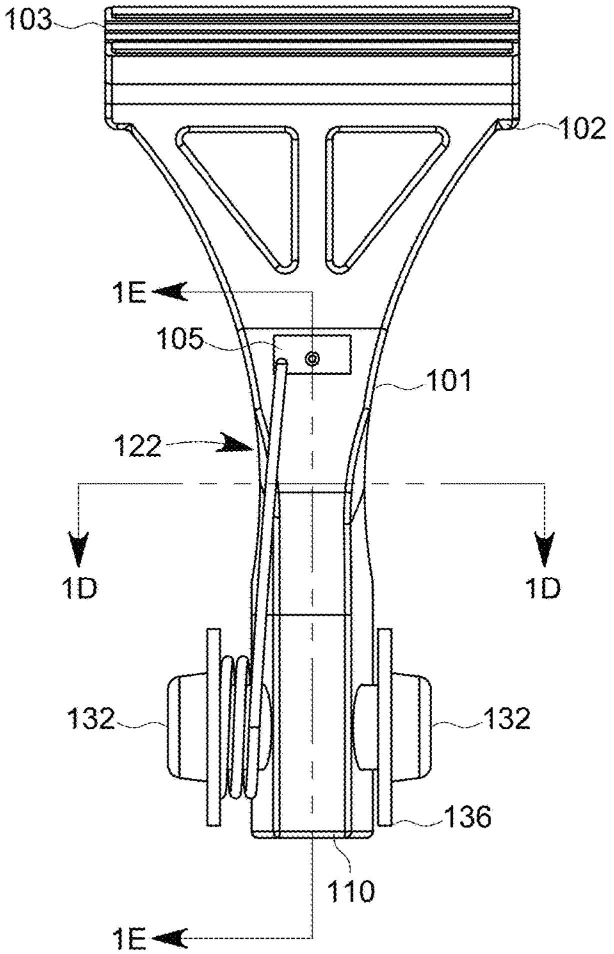
FIG. 1C illustrates a front view of the shaving razor apparatus according to one embodiment of the present disclosure.

FIG. 1C presents a front view of the rotating shaving razor apparatus 100 according to one embodiment of the present disclosure. This view highlights the proximal end 110 of the handle 101 and illustrates the spatial orientation of the rotary assembly 120. As depicted, the rotary assembly 120 comprises a pivot rod 134 extending transversely through the handle body and terminating at opposing ends in respective securing members 136. FIG. 1C further illustrates the positioning of catch 105, which is operatively associated with the spring 122 and configured to provide rotational resistance and recoil bias when the handle 101 pivots during use. The rotary assembly is configured to allow rotational movement of the handle about a transverse axis and including a spring-loaded recoil mechanism functioning as a recoil means in conjunction with catch 105 and pivot rod 134.

Figure 1D:
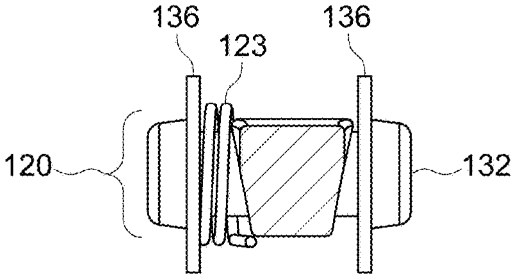
FIG. 1D illustrates a cross sectional view of the shaving razor apparatus taken generally along line 1D-1D in FIG. 1C, according to one embodiment of the present disclosure.

FIG. 1D illustrates a cross sectional view of the shaving razor apparatus taken generally along line 1D-1D in FIG. 1C, according to one embodiment of the present disclosure. FIG. 1D illustrates the pivot rod 134 seated within channel 106 formed in the inner wall of the handle body, with securing members 136 constraining lateral movement and axial displacement enabling controlled rotation of the handle. Specifically, FIG. 1D highlights the precise seating of the pivot rod 134. The pivot rod is rotatably nested within the channel 106, an opening in the inner wall of the handle body. The holding members are positioned to constrain any unwanted axial displacement of the pivot rod 134 while allowing the pivot rod 134 to remain stationary and the handle to rotate about the pivot rod during shaving.

Figure 1E:
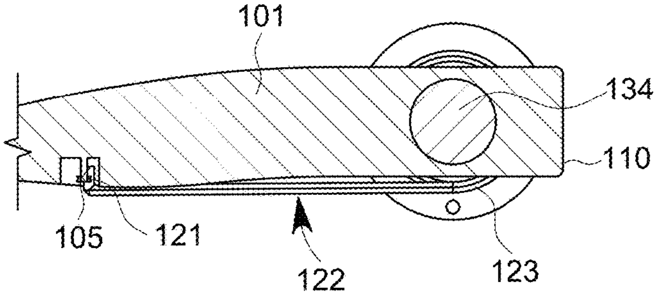
FIG. 1E illustrates a cross sectional view of the shaving razor apparatus taken generally along line 1E-1E in FIG. 1C, according to one embodiment of the present disclosure.

FIG. 1E illustrates a cross sectional view of the shaving razor apparatus taken generally along line 1E-1E in FIG. 1C, according to one embodiment of the present disclosure. FIG. 1E shows the alignment of the rotary assembly 120 relative to the longitudinal axis of the handle 101. In this embodiment, the spring 122 is concentrically positioned about the pivot rod 134 and applies a return force as the handle is rotated by a user. The spring is biased to return the handle to a neutral position following rotation. FIG. 1E illustrates the concentric alignment of the rotary assembly 120 with respect to the longitudinal axis of the handle 101. Within this particular embodiment is the spring 122, which is positioned concentrically around the pivot rod 134. This arrangement enables the spring to exert a consistent return force, which is applied as the handle undergoes rotation by a user.

Figure 1F:
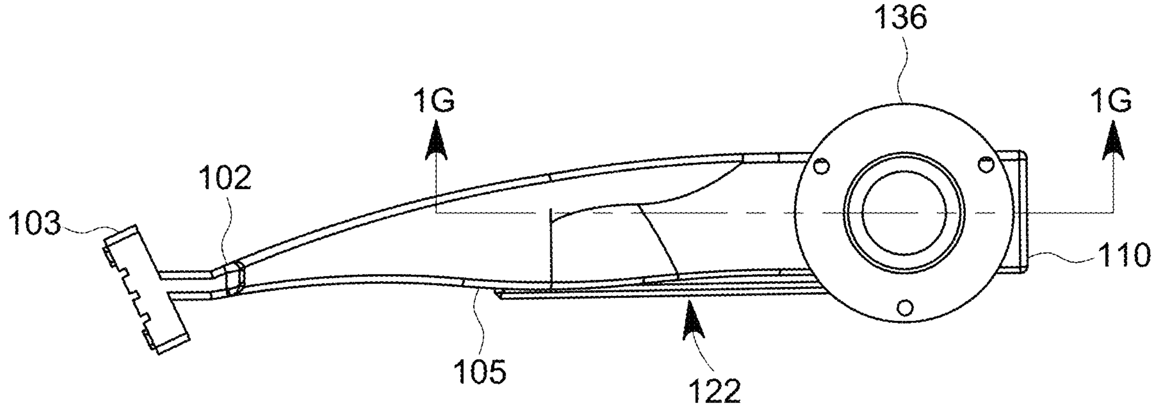
FIG. 1F illustrates a side view of the rotating shaving razor apparatus, according to one embodiment of the present disclosure.

FIG. 1F illustrates a side view of the rotating shaving razor apparatus 100 according to one embodiment of the present disclosure. The device includes a non-elongated handle terminating in a blade-carrying head 103. Positioned adjacent to the proximal end 110 of the handle is a rotary assembly 120, which enables angular pivoting of the handle during shaving. The rotary assembly includes securing members 136 that facilitate the handle's rotation about a pivot axis. Within this embodiment of the rotary assembly is the spring 122. This spring is positioned concentrically around the pivot rod 134. The concentric arrangement of the spring around the pivot rod allows for optimal distribution of forces and a balanced application of tension. Furthermore, the spring 122 extends along the bottom surface of the handle, a path that enables it to effectively engage and terminate at the catch 105. This extended reach of the spring ensures that it exerts the necessary tension and resistance to control the handle's movement and secure its position when engaged with the catch. The interplay between the holding members, the concentrically positioned spring, and the pivot rod, culminating in the engagement with the catch, collectively defines the functional operation of the rotary assembly.

Figure 1G:
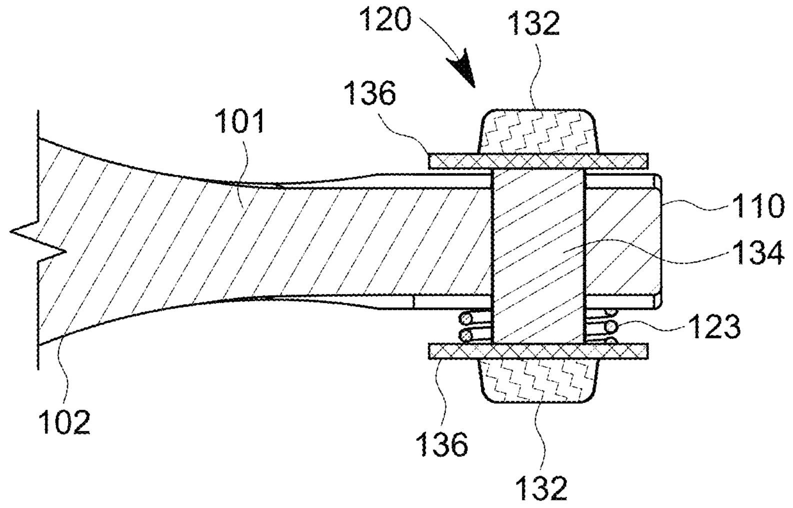
FIG. 1G illustrates a cross sectional view of the shaving razor apparatus taken generally along line 1G-1G in FIG. 1F, according to one embodiment of the present disclosure.

FIG. 1G illustrates a cross sectional view of the rotating shaving razor apparatus 100 taken generally along line 1G-1G in FIG. 1F, showing the internal configuration of the rotary assembly 120 according to one embodiment of the present disclosure. Pivot rod 134 is centrally positioned within the handle, extending traversely. Securing members 136 situated at the lateral extremities of the pivot rod 134, engage the handle 101 structure, thereby maintaining its axial alignment and facilitating angular articulation of the handle while preserving rotational stability. FIG. 1G shows the mechanical interplay between the internal pivot components and their external support features.

Figure 1H:
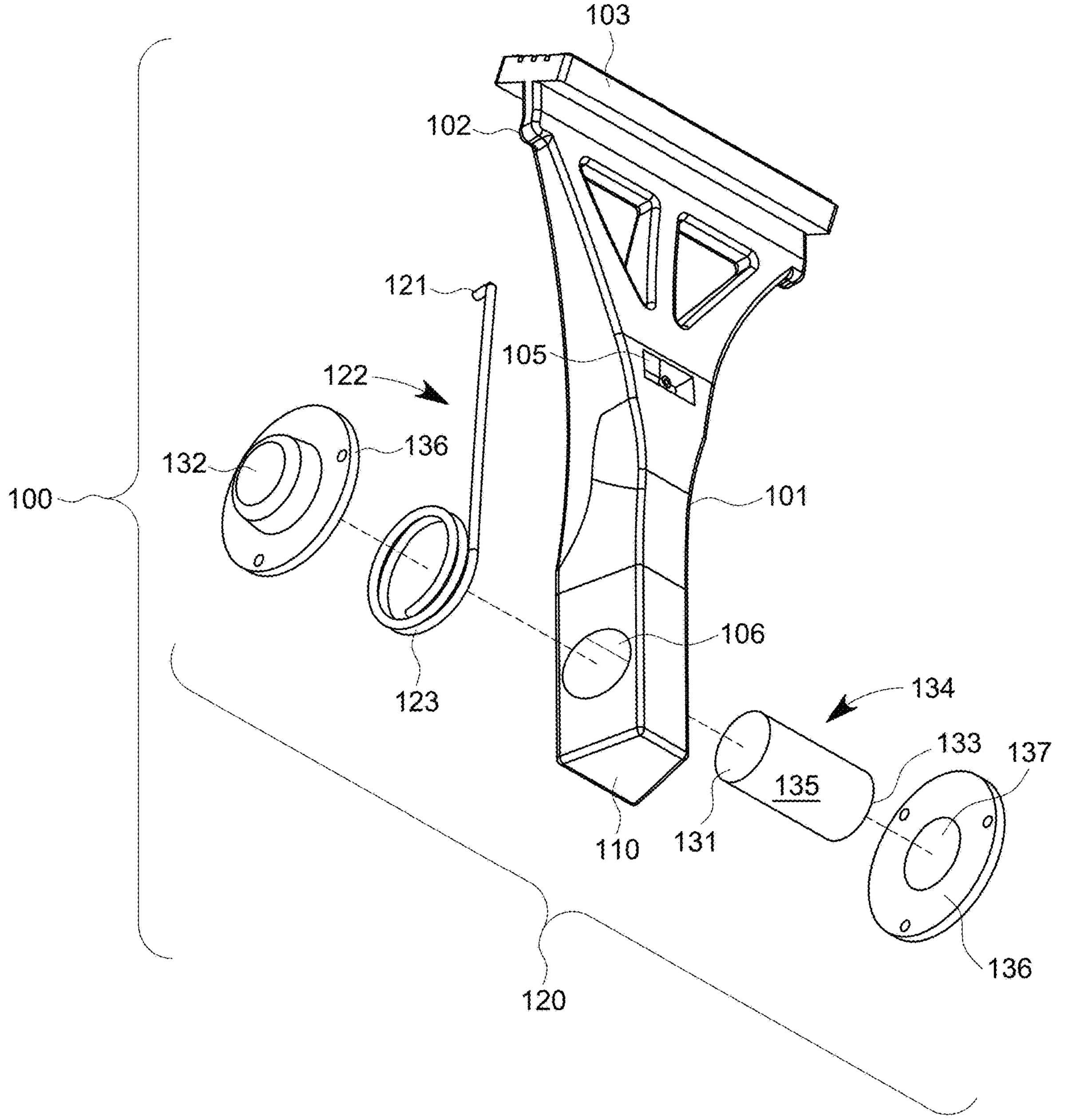
FIG. 1H illustrates an exploded view of the rotating shaving razor apparatus, according to one embodiment of the present disclosure.

FIG. 1H illustrates an exploded perspective view of the rotating shaving razor apparatus, showing the primary structural components of the rotary assembly in an unassembled configuration. The shaving razor handle 101 features a transverse channel 106 at a proximal end 110 extending laterally through the handle. A pivot rod 134, comprising a first lateral end 131, a second lateral end 133, and a circular medial surface 135, is configured to pass through channel 106 in the proximal end of the handle.

In a preferred embodiment, securing members 136 each have a cutout 137 for receiving the pivot rod ends. The securing members function both as retainers and holding elements, maintaining the first and second lateral ends 131 and 133 within the channel 106 while allowing the handle to pivot about its longitudinal axis relative to the frame or support structure.

Alternatively, the pivot rod may be integrally molded with the handle, where the holding members are rotatably connected at the lateral ends of the pivot rod. In this configuration, the holding members remain stationary while the pivot rod and the handle together rotate about the pivot axis. In this configuration, the holding members remain fixed while the pivot rod and handle jointly rotate about the pivot axis, offering a variation in dynamic assembly and mechanical interaction. The exploded view illustrates the relative positioning and assembly sequence of the internal components, facilitating an understanding of the rotational coupling mechanism employed in the apparatus.

Figure 2A:
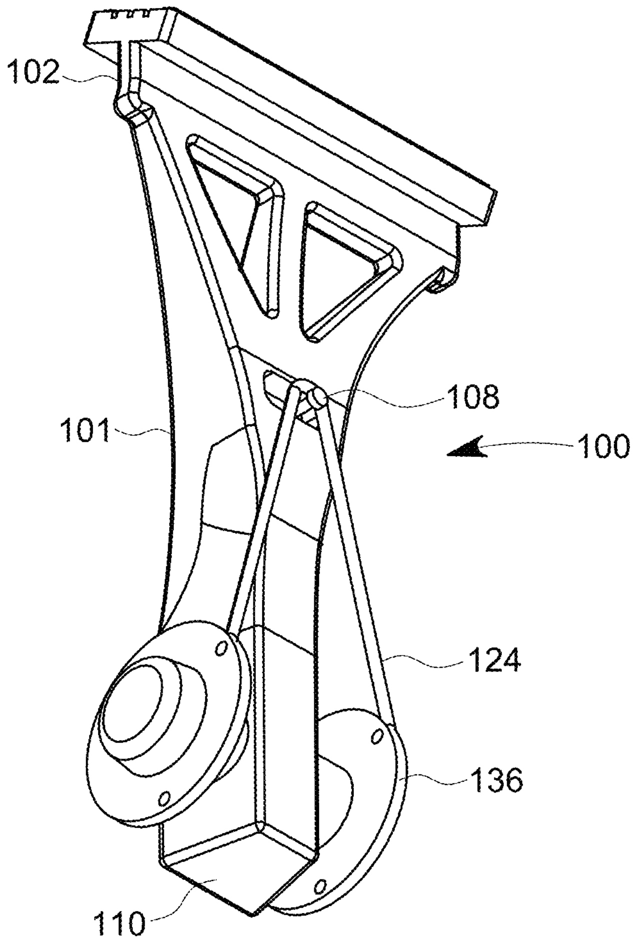
FIG. 2A illustrates a perspective view of the rotating shaving razor apparatus, according to one embodiment of the present disclosure.

FIG. 2A illustrates a perspective view of the rotating shaving razor apparatus 100, according to one embodiment of the present disclosure. FIG. 2A illustrates an alternate embodiment of the rotating shaving razor apparatus similar in overall structure to that shown in FIG. 1A, but incorporating a variation in biasing and retention components. Specifically, in this configuration, an elastic biasing member, referred to generally as elastic member 124 is substituted in place of the spring 122 shown in FIG. 1A to provide tension and biasing force. Additionally, a post 108 replaces the catch 105, serving as a positional connection point for the elastic member 124. This embodiment offers an alternative means of restoring or biasing the handle position while maintaining the overall mechanical function of the rotary interface. In an embodiment, the elastic biasing member is an elastic or rubber band or related elastomeric loop configured to reversibly stretch.

Figure 2B:
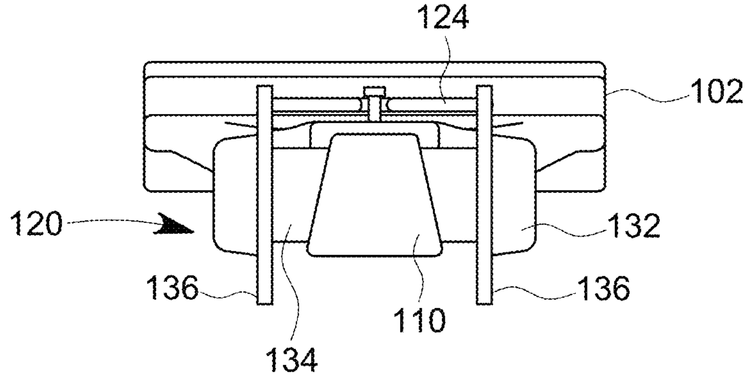
FIG. 2B illustrates a bottom view of the shaving razor apparatus, according to one embodiment of the present disclosure.

FIG. 2B illustrates a bottom perspective view of the rotating shaving razor apparatus 100, according to one embodiment of the present disclosure. This view highlights the arrangement of the rotary assembly 120 components as seen from the underside of the device. Notably, elastic member 124 is shown as an integral element of the assembly's biasing mechanism. The elastic member 124 extends between and is anchored at opposing ends to the securing members 136, which are fixed to lateral portions of the pivot rod 134. A central portion of the rubber band is looped over a post 108 positioned medially along the band's path. The post 108 may comprise any structural projection, peg, or anchoring feature configured to maintain tension within the rubber band and to help stabilize the band's placement during operation. This arrangement enables the elastic member 124 to provide consistent biasing force that aids in returning the handle to a neutral or resting position following pivoting movement, thereby enhancing the operational control and mechanical responsiveness of the shaving razor apparatus.

Figure 2C:
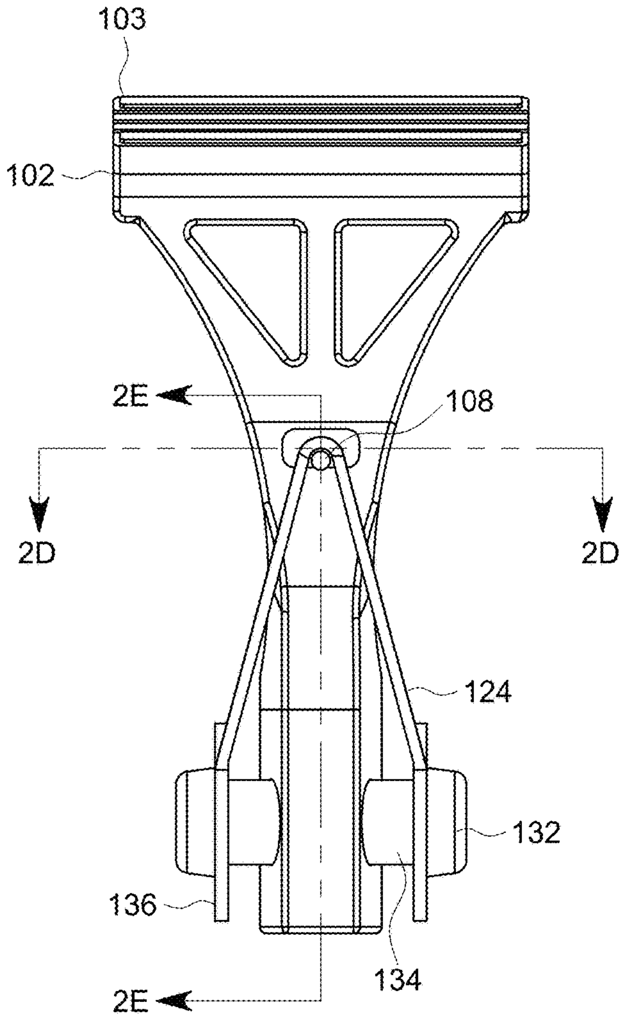
FIG. 2C illustrates a front view of the shaving razor apparatus according to one embodiment of the present disclosure.

FIG. 2C illustrates a front view of the rotating shaving razor apparatus 100 according to one embodiment of the present disclosure. A recoil means, in one embodiment is an elastic member 124, maintains pressure, allowing the handle to elevate and depress in response to bias pressure applied by the user's index finger. The ends of the elastic member 124 are connected to securing members 136. A post 108, affixed to the underside of the handle, has elastic member 124 placed over its body, ensuring the recoil means remains taut when bias pressure is applied by the user's index finger. The rotary assembly enables the razor head to continually remain in contact with the skin surface, adapting to increased or decreased pressure and the shape of the area being shaved. While a flexible rubber band is the preferred embodiment for the recoil mechanism, those skilled in the art will understand that any pressure-generating means, such as a spring or gravity-loaded recoil mechanism, can be used to enable the handle to rotate freely around the pivot rod.

Figure 2D:
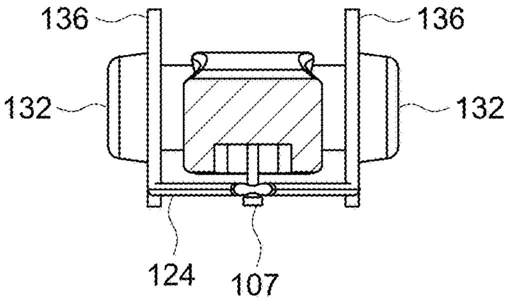
FIG. 2D illustrates a cross sectional view of the shaving razor apparatus taken generally along line 2D-2D in FIG. 2C, according to one embodiment of the present disclosure.

FIG. 2D illustrates a cross-sectional view of the rotating shaving razor apparatus 100 taken generally along line 2D-2D in FIG. 2C, according to one embodiment of the present disclosure. The overall structure mirrors the configuration shown in FIG. 1D, with the pivotal distinction being the use of a rubber band in place of the coil spring as the biasing element within the rotary assembly.

As shown, the pivot rod 134 is seated laterally through channel 106 formed in the inner wall of the handle 101. The pivot rod 134 includes a first lateral end, a second lateral end, and a medial section, and is rotatably nested within the channel 106 to permit angular motion of the handle relative to the fixed blade-carrying head. Securing members 136 are disposed at the ends of the rotary assembly to maintain the pivot rod in a fixed axial position and to constrain any lateral or translational movement.

In this embodiment, a rubber band is used as elastic member 124 that extends between the securing members and loops over a post 108 creating a resilient tension path that biases the handle toward a neutral position following rotational displacement. The rubber band functions analogously to the spring shown in FIG. 1D but introduces an alternative elastic mechanism for restoring the handle's orientation during shaving.

Figure 2E:
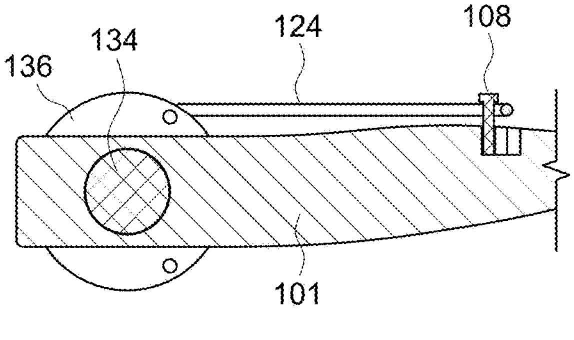
FIG. 2E illustrates a cross sectional view of the shaving razor apparatus taken generally along line 2E-2E in FIG. 2C, according to one embodiment of the present disclosure.

FIG. 2E illustrates a cross sectional view of the rotating shaving razor apparatus 100 taken generally along line 2E-2E in FIG. 2C, according to one embodiment of the present disclosure. The illustrated configuration is structurally similar to the arrangement shown in FIG. 1E, but substitutes an elastic member 124 in place of the spring 122, and includes a post 108 instead of the catch 105.

The elastic member 124 is depicted extending between opposing securing members and looped over the post 108, which is positioned centrally along the handle 101. The post 108 may take the form of a protruding pin, boss, or other structural feature positioned on the handle. Its purpose is to maintain the elastic member in a tensioned state and restrict lateral displacement during handle rotation. This configuration provides a biasing force that encourages the handle to return toward its neutral or rest orientation after angular deflection, thus assisting with controlled shaving movement while reducing user effort.

Figure 2F:
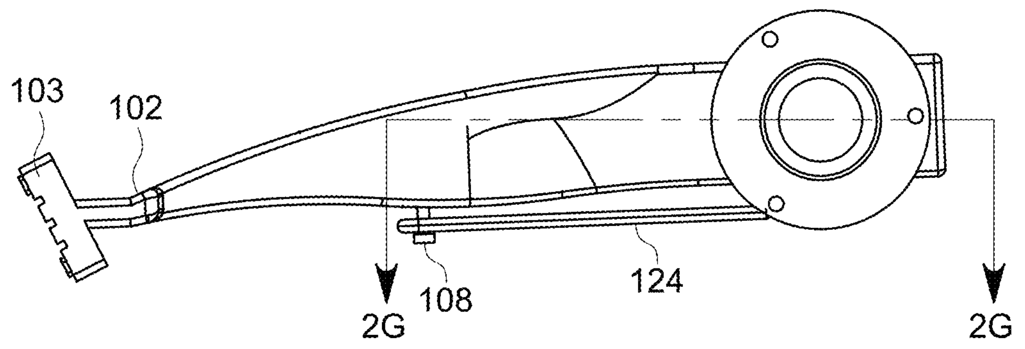
FIG. 2F illustrates a side view of the rotating shaving razor apparatus, according to one embodiment of the present disclosure.

FIG. 2F illustrates a side view of the rotating shaving razor apparatus 100, according to one embodiment of the present disclosure. This side view shows the assembled shaving razor apparatus with a post 108. In this embodiment, post 108 is affixed to the underside of the shaving razor apparatus with an elastic member 124 placed over it. Preferably, post 108 protrudes perpendicularly from the handle, allowing the recoil mechanism to remain taut against bias pressure from the user's index finger. While a 90-degree rod is preferred for post 108, other elements such as hooks, clasps, clips, snags, loops, and hitches may also be used to provide a point of resistance for the elastic member 124.

Figure 2G:
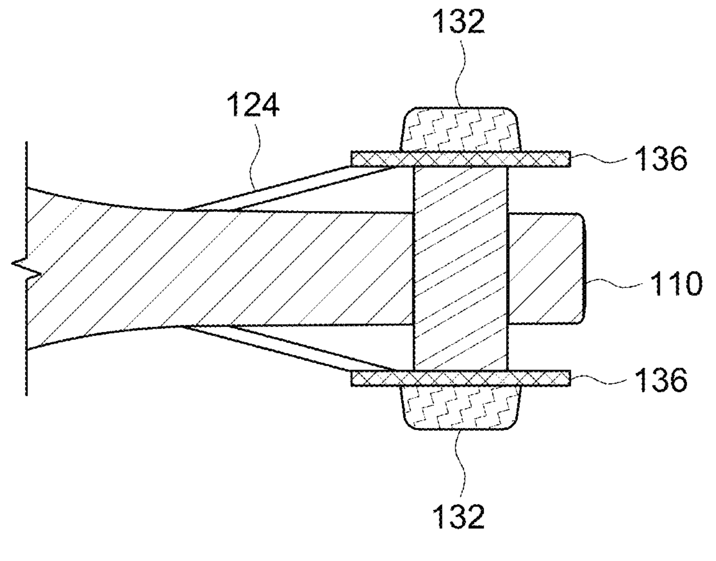
FIG. 2G illustrates a cross sectional view of the shaving razor apparatus taken generally along line 2G-2G in FIG. 2F, according to one embodiment of the present disclosure.

FIG. 2G illustrates a cross sectional view of the rotating shaving razor apparatus 100 taken generally along line 2G-2G in FIG. 2F, according to one embodiment of the present disclosure. The sectional view reveals the interior arrangement of the rotary assembly, with a focus on the elastic biasing structure. An elastic member 124, such as a rubber band, is shown extending laterally between opposing securing members 136 of the rotary assembly. The elastic member is positioned and secured in tension to maintain controlled biasing of the handle.

FIG. 2G further illustrates grips 132 disposed on securing members 136, which securing members 136 engage the elastic member and help preserve its placement and tautness.

The elastic member may pass over or under internal protrusions or guide elements that influence its path and assist in restoring the handle to a neutral position after angular displacement. This configuration provides resilient rotational resistance and enables repeatable elevation or depression of the handle during shaving.

Figure 2H:
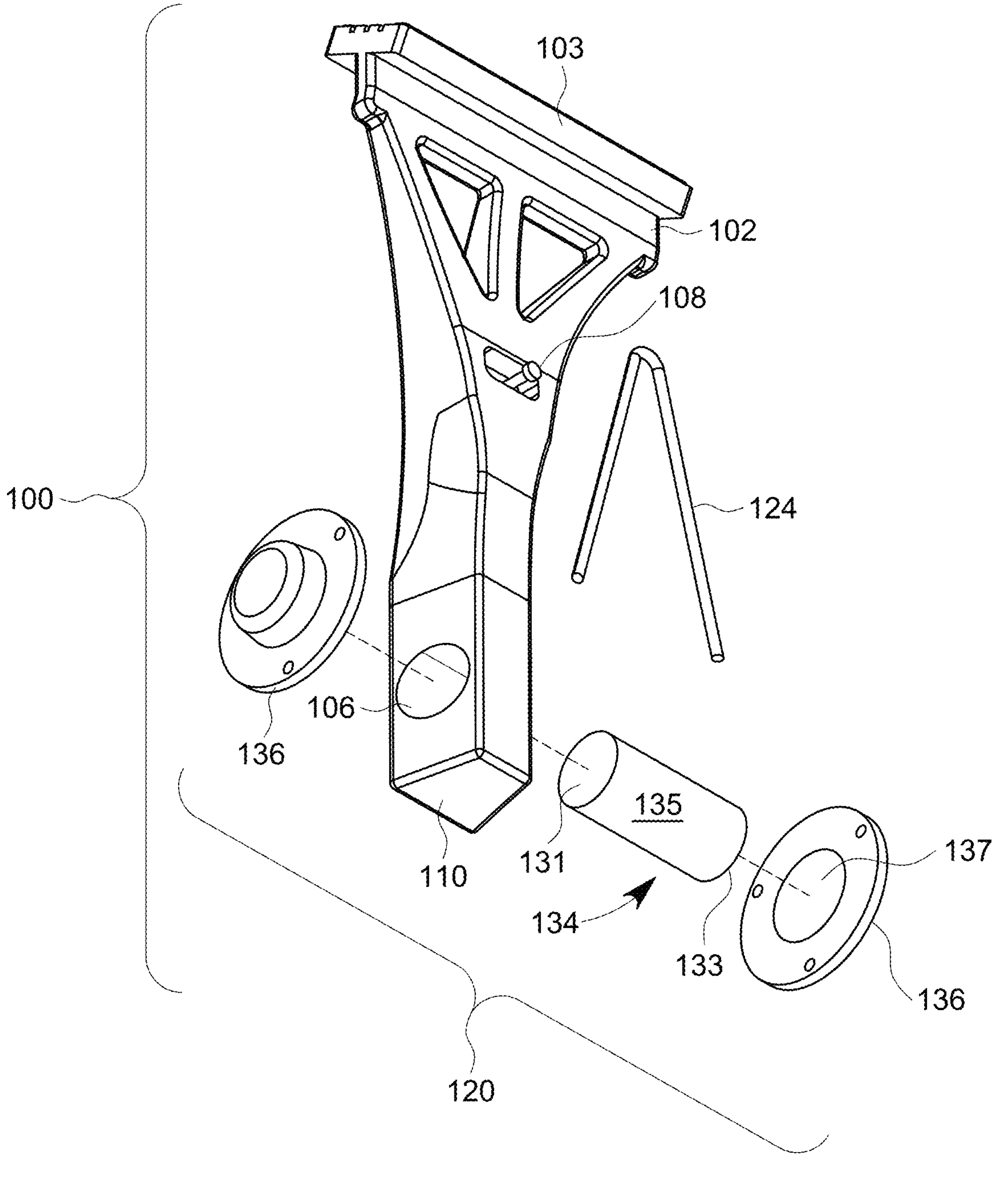
FIG. 2H illustrates an exploded view of the rotating shaving razor apparatus, according to one embodiment of the present disclosure.

FIG. 2H illustrates an exploded perspective view of the rotating shaving razor apparatus 100, according to one embodiment of the present disclosure. Structurally similar to FIG. 1H, this embodiment replaces the spring-based return mechanism with an elastic member 124 and substitutes a post 108 for the previously shown catch 105.

The razor handle 101 includes a proximal end 110 and a laterally extending channel 106 formed in the handle 101. A pivot rod 134, shown with a first lateral end 131, a second lateral end 133, and a circular medial surface 135, is oriented transversely and is designed to pass through channel 106. Securing members 136 are positioned at the lateral ends of the pivot rod and serve as anchoring connectors that maintain the rod's axial position within the rotary housing. These securing members also function to allow the handle to pivot relative to the rod, thereby enabling angular articulation during use.

In this embodiment, an elastic member 124, such as a rubber band, is installed between the securing members and is looped over a post 108, which is mounted within the internal framework of the rotary assembly. The post 108 may comprise a protrusion, pin, or molded boss, and is structured to maintain the tension and alignment of the elastic member throughout handle movement. This elastic configuration biases the handle toward a neutral orientation during shaving and provides a resilient restoring force following angular displacement.

Alternatively, the pivot rod may be integrally molded to the handle, with the holding members rotatably coupled to the lateral ends of the pivot rod. In this configuration, the holding members remain fixed while the pivot rod and handle jointly rotate about the pivot axis, offering a variation in dynamic assembly and mechanical interaction. The exploded view illustrates the relative positioning and assembly sequence of the internal components, facilitating an understanding of the rotational coupling mechanism employed in the apparatus.

The exploded layout in FIG. 2H illustrates the assembly sequence of the rotary components and the spatial relationships between the pivot mechanism, elastic biasing system, and handle structure.

Figure 3A:
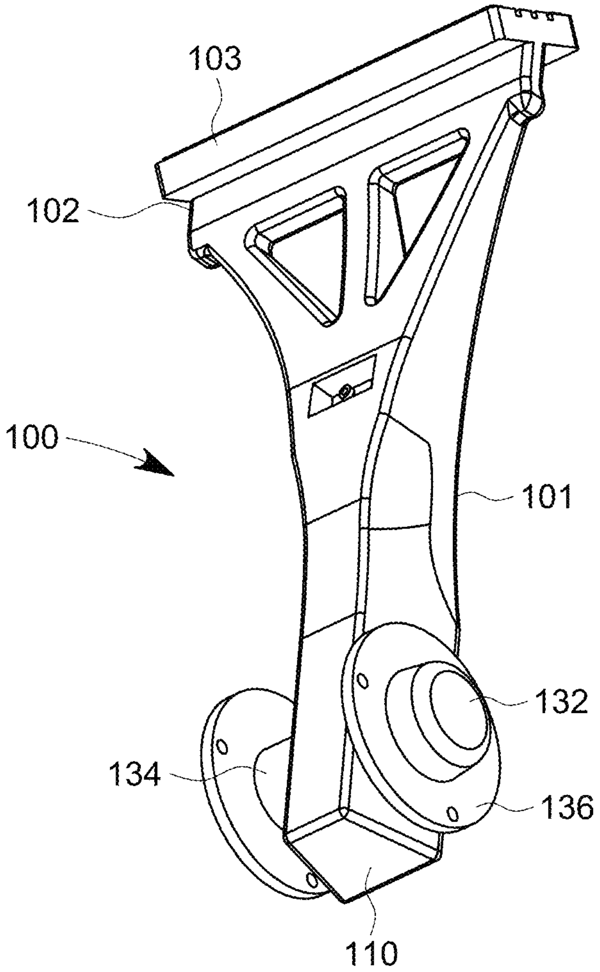
FIG. 3A illustrates a perspective view of the rotating shaving razor apparatus, according to one embodiment of the present disclosure.

FIG. 3A illustrates a perspective view of the rotating shaving razor apparatus 100, according to one embodiment of the present disclosure. This embodiment is structurally similar to the configurations shown in FIGS. 1A and 2A, with the primary distinction being the omission of any recoil or biasing components-such as elastic member 124, spring 122, catch 105, or post 108.

The rotating shaving razor apparatus 100 includes a compact handle 101 having a proximal end 110 and a distal end 102. The handle is ergonomically shaped and dimensioned to be comfortably gripped by a user, and may be formed from lightweight yet durable materials including plastic, rubber, or metal. The rotary assembly 120 is positioned near the proximal end 110 of the handle and includes a pivot rod 134 retained by opposing securing members 136. The pivot rod is transversely mounted and establishes an axis of rotation, enabling the handle to pivot relative to the blade-carrying head.

Unlike prior embodiments that incorporate a spring or elastic member to return the handle to a neutral orientation, this embodiment does not include any form of recoil bias. The handle rotates freely about the pivot rod without resistance or automatic realignment, allowing the user full manual control over angular positioning. This configuration may be advantageous in applications where freeform adjustment is desired without restorative force interfering with the shaving angle or pressure.

Figure 3B:
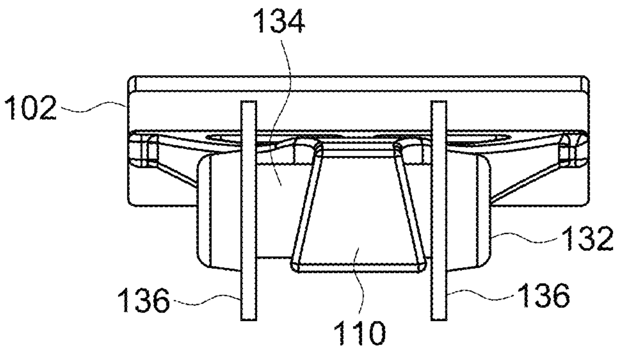
FIG. 3B illustrates a bottom view of the shaving razor apparatus, according to one embodiment of the present disclosure.

FIG. 3B illustrates a bottom view of the rotating shaving razor apparatus 100, according to one embodiment of the present disclosure. This embodiment corresponds structurally to the configurations shown in FIGS. 1B and 2B, but intentionally omits any recoil or biasing mechanism, such as a spring, elastic member, catch, or post.

The view reveals the underside of the rotary assembly, showing the relative positioning of the securing members 136 and the handle 101 as it interfaces with the pivot rod 134. The securing members 136 are spaced laterally at opposing ends of the rotary housing and function to retain the pivot rod in a fixed axial orientation. However, in this embodiment, no elastic or resilient elements are connected between the securing members or routed over any central guiding feature.

As a result, the handle is permitted to rotate freely about the axis defined by the pivot rod without any inherent return-to-neutral functionality. This configuration provides unresisted angular articulation, enabling the user to manually position and maintain the handle at a preferred shaving angle.

Figure 3C:
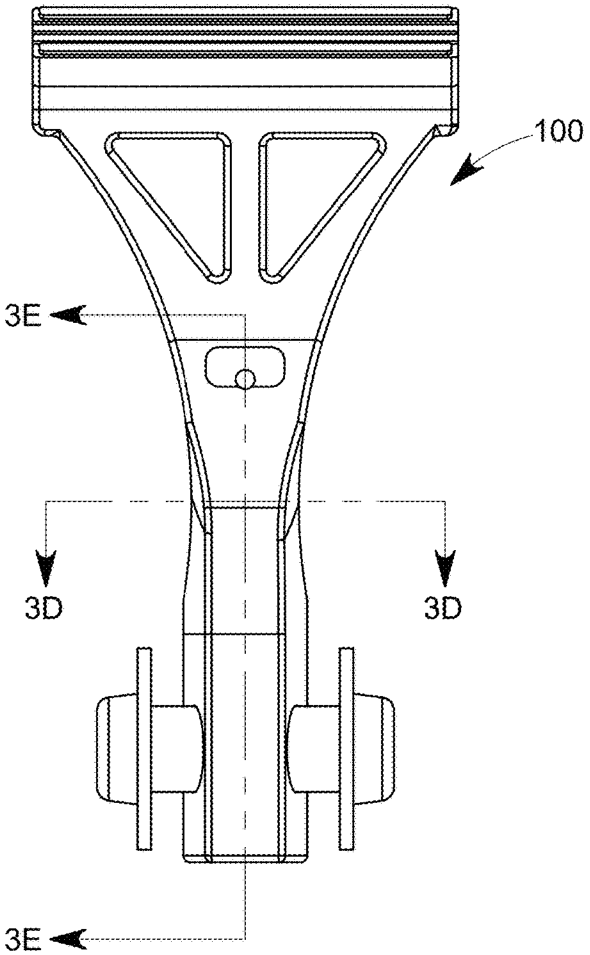
FIG. 3C illustrates a front view of the shaving razor apparatus according to one embodiment of the present disclosure.

FIG. 3C illustrates a front-facing view of the rotating shaving razor apparatus 100, according to one embodiment of the present disclosure. The image displays the forward profile of the device, showing the frontal geometry of the handle 101 and the rotary assembly 120 as seen head-on. The pivot rod 134 is transversely mounted across the handle, with opposing ends seated in the securing members 136. The handle extends downward from the rotary assembly and is free to pivot about the axis defined by the pivot rod. This embodiment similarly excludes any return-to-neutral recoil mechanism, showcasing an unimpeded rotation interface between the handle and the blade-carrying head, as further demonstrated in companion views such as FIG. 3B.

Figure 3D:
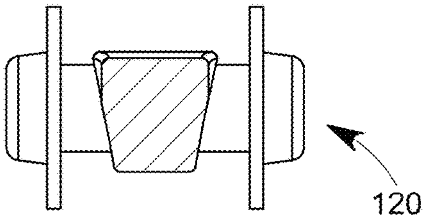
FIG. 3D illustrates a cross sectional view of the shaving razor apparatus taken generally along line 3D-3D in FIG. 3C, according to one embodiment of the present disclosure.

FIG. 3D illustrates a cross-sectional view of the rotating shaving razor apparatus 100, taken generally along line 3D-3D in FIG. 3C, according to one embodiment of the present disclosure. This embodiment corresponds to the freely rotating configuration shown in FIGS. 3A through 3C and similarly omits any recoil or biasing mechanism such as a spring, elastic member, post, or catch.

The sectional view reveals the internal structure of the rotary assembly 120 at the proximal end of handle 101. A pivot rod 134 is shown transversely oriented within channel 106 and is retained at its opposing ends by securing members 136. The pivot rod defines the axis about which the handle rotates and is supported in a manner that permits angular movement of the handle relative to the pivot rod. Unlike prior embodiments, no recoil components are present between or around the securing members, enabling unrestricted and unbiased pivoting of the handle during shaving use. This configuration allows full manual control over angular adjustment without restorative resistance or return-to-neutral force.

Figure 3E:
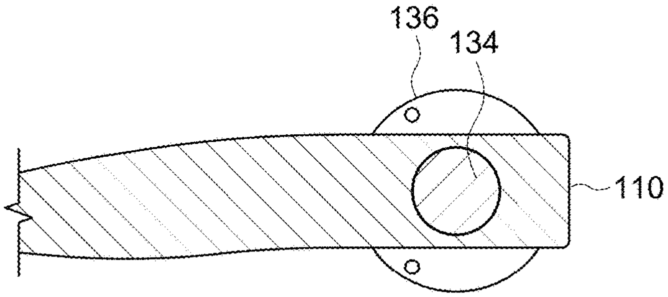
FIG. 3E illustrates a cross sectional view of the shaving razor apparatus taken generally along line 3E-3E in FIG. 3C, according to one embodiment of the present disclosure.

FIG. 3E illustrates a cross-sectional view of the rotating shaving razor apparatus 100, taken generally along line 3E-3E in FIG. 3C, according to one embodiment of the present disclosure. This embodiment corresponds to the freely rotating configuration shown in FIGS. 3A through 3D and similarly omits any recoil or biasing mechanism such as a spring, elastic member, post, or catch.

The sectional view reveals the internal structure of the rotary assembly 120 at the proximal end 110 of handle 101. A pivot rod 134 is shown transversely oriented within channel 106 and is retained at its opposing ends by securing members 136. The pivot rod defines the axis about which the handle rotates and is supported in a manner that permits angular movement of the handle relative to the pivot rod 134. Unlike prior embodiments, no recoil components are present between or around the securing members, enabling unrestricted and unbiased pivoting of the handle during shaving use. This configuration allows full manual control over angular adjustment without restorative resistance or return-to-neutral force.

Figure 3F:
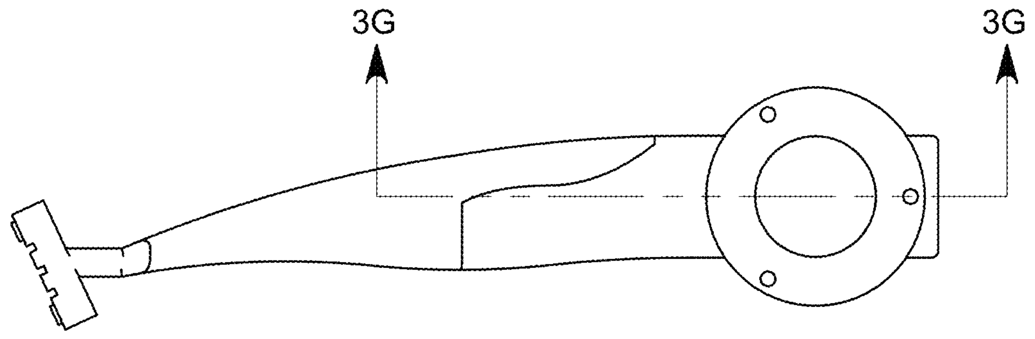
FIG. 3F illustrates a side view of the rotating shaving razor apparatus, according to one embodiment of the present disclosure.

FIG. 3F illustrates a side view of the rotating shaving razor apparatus, according to one embodiment of the present disclosure. This embodiment is functionally consistent with those shown in FIGS. 3A through 3E and includes no recoil mechanism such as a spring, elastic band, catch, or post. The side profile reveals the longitudinal arrangement of the handle 101 relative to the rotary assembly 120, which is positioned near the handle's proximal end 110. The pivot rod 134 is disposed transversely across the rotary assembly and retained at opposing ends by securing members 136. The absence of any restoring or biasing structure allows the handle to pivot freely about the axis of the pivot rod, placing full control of angular orientation in the hands of the user during shaving.

Figure 3G:
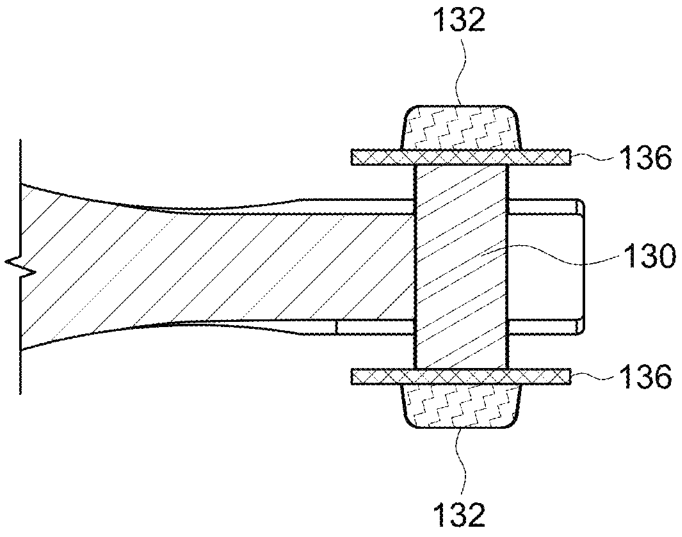
FIG. 3G illustrates a cross sectional view of the shaving razor apparatus taken generally along line 3G-3G in FIG. 3F, according to one embodiment of the present disclosure.

FIG. 3G illustrates a cross sectional view of the shaving razor apparatus taken generally along line 3G-3G in FIG. 3F, according to one embodiment of the present disclosure. This section highlights the internal arrangement of the rotary assembly 120 with an emphasis on the pivot rod 134 and its interface with the surrounding housing. The pivot rod is seated within laterally opposed structural supports or securing members 136 that retain the rod in a fixed axial position. No recoil element is included in this configuration—i.e., there is no spring 122, elastic member 124, or intervening stop such as catch 105 or post 108. The design enables unimpeded rotation of the handle about the pivot axis, allowing the user to manually position the handle without resistance or automatic realignment.

Figure 3H:
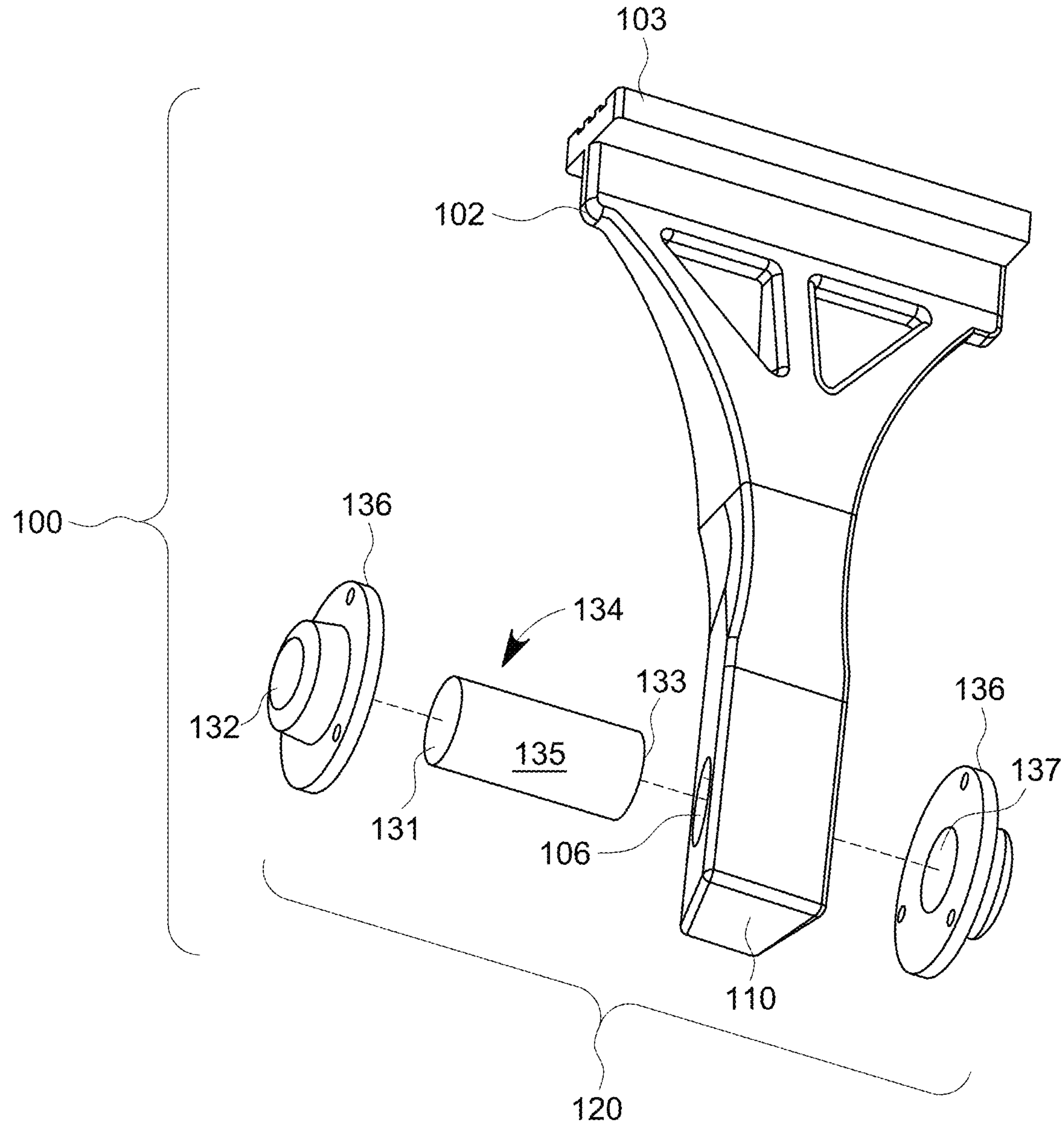
FIG. 3H illustrates an exploded view of the rotating shaving razor apparatus, according to one embodiment of the present disclosure.

FIG. 3H illustrates an exploded view of the rotating shaving razor apparatus, according to one embodiment of the present disclosure. This embodiment corresponds to the bias-free configuration depicted in FIGS. 3A through 3G and does not include any biasing or recoil components such as a spring, elastic member, post, or catch.

The exploded view reveals the individual components of the rotary assembly 120 in unassembled form. The handle 101 is shown with a proximal end 110 including a transverse channel 106. A pivot rod 134 having a first lateral end 131, a second lateral end 133, and a medial surface 135 is positioned to pass laterally through the channel 106. Securing members 136 are disposed at each end of the pivot rod and are designed to receive and retain the respective first and second lateral ends. These securing members serve to fix the axial position of the pivot rod within the rotary housing while permitting the handle 101 to rotate freely about the pivot rod's axis. The absence of any recoil biasing structure in this embodiment provides unimpeded manual control of the handle's angular displacement during shaving.

Alternatively, the pivot rod may be integrally molded with the handle, where the holding members are rotatably coupled to the lateral ends of the pivot rod. In this configuration, the holding members remain fixed while the pivot rod and handle jointly rotate about the pivot axis, offering a variation in dynamic assembly and mechanical interaction. The exploded view illustrates the relative positioning and assembly sequence of the internal components, facilitating an understanding of the rotational coupling mechanism employed in the apparatus. This exploded configuration clearly demonstrates the relative arrangement and assembly sequence of the structural components that make up the rotary interface.

Figure 4:
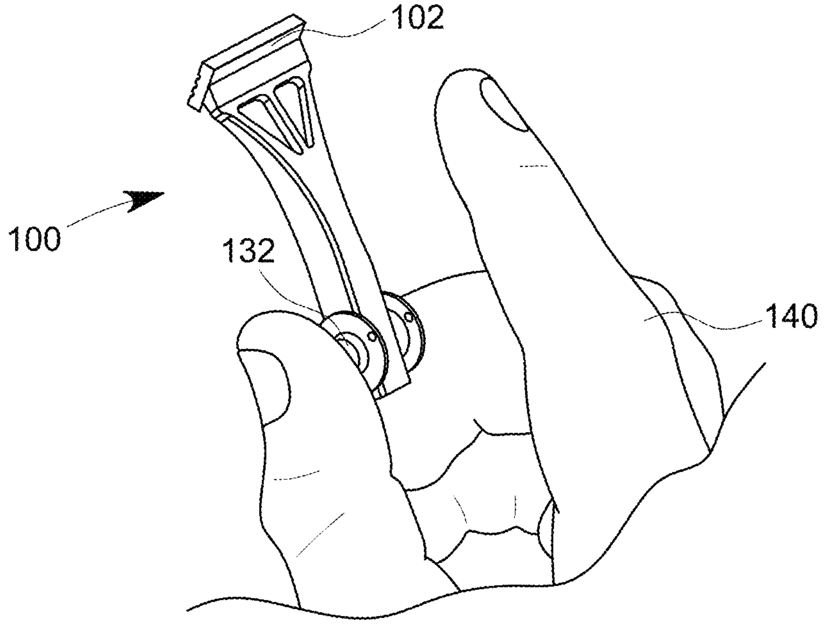
FIG. 4 is a perspective view of the shaving razor apparatus held by a user with the thumb and middle finger, prior to shaving position, according to one embodiment of the present disclosure.

FIG. 4 illustrates a perspective view of the rotating shaving razor apparatus 100 as held by a user prior to shaving, according to one embodiment of the present disclosure. The handle 101 is oriented upright and grasped between the user's thumb and middle finger near the rotary assembly 120, with the index finger 140 applying forward bias pressure. A recoil mechanism is positioned adjacent the lower region of the handle and operatively linked to the medial portion of the pivot rod. The recoil mechanism may employ a spring, elastic band, or gravitational force to counteract the applied pressure of index finger 140, thereby allowing the handle and blade assembly to return to a neutral orientation and enabling gentle lift-off from the face 150 during or after shaving. The handle pivots clockwise around the rotary assembly during use, and this movement remains consistent with or without activation of the recoil mechanism.

Figure 5:
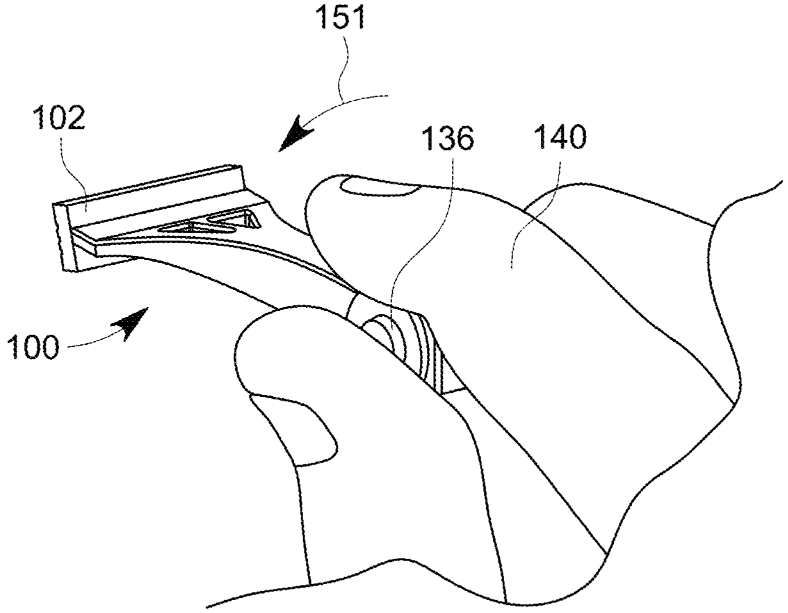
FIG. 5 is a perspective view of the shaving razor apparatus held by a user with a thumb, middle finger, and the index finger in the shaving position, according to one embodiment of the present disclosure.

FIG. 5 illustrates the rotating shaving razor apparatus 100 held by a user in an active shaving grip. The thumb and middle finger grip opposite sides of the rotary assembly 120, while the index finger 140 applies pressure to the distal end of the handle 101 in the direction of arrow 151 to drive the razor cartridge. This ergonomic configuration allows the handle to move on the pivot point of the rotary assembly, facilitating elevation and depression during shaving. Unlike a traditional razor which typically relies on wrist, elbow, and arm motion this apparatus enables refined angular control through localized finger manipulation.

FIG. 5 further shows the grip 132 positioning along the securing members 136. While the thumb and middle finger are shown pinching opposite sides of the assembly, alternative finger configurations may also comfortably engage the opposing ends, enhancing ergonomic flexibility. The figures collectively illustrate the ergonomic alignment of the user's hand, the pivot rod 134, and the longitudinal axis of the handle that contribute to improved control, precision, and skin contact across varied shaving angles.

Figure 6:
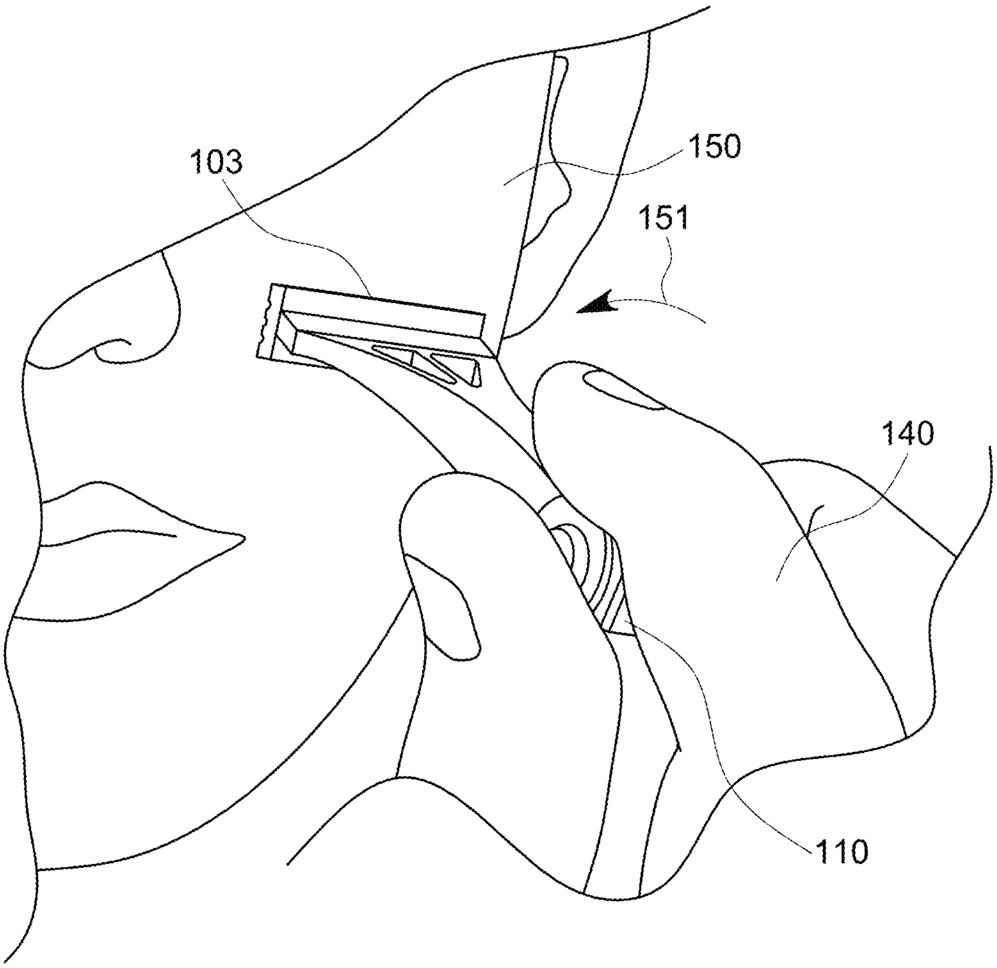
FIG. 6 is a perspective view of the shaving razor apparatus held by a user with a thumb, middle finger, and the index finger in the shaving position on the face of a user, according to one embodiment of the present disclosure.

FIG. 6 illustrates the rotating shaving razor apparatus 100 positioned adjacent to a user's face 150, with the blade-carrying head aligned for direct engagement with the skin surface. The user's grip employs the thumb, middle finger, and index finger which facilitates controlled operation, particularly effective for shaving beneath the chin, around extremities, and along hard-to-reach facial contours. In the depicted configuration, the handle pivots counterclockwise about the rotary assembly 120 while the razor head maintains uninterrupted skin contact owing to the dynamic pivoting capability enabled by the rotary design.

FIG. 6 further emphasizes the compact length of the handle relative to the user's hand of the present disclosure, approximately half the length of conventional razors. The short handle configuration gripped near the pivot interface enables enhanced angular precision, improved skin conformity, and greater shaving efficiency across a wide range of user orientations. The handle's proportional size relative to the user's hand highlights ergonomic advantages, including tighter control and more refined maneuverability during operation.

It is apparent that although the disclosure has been described in connection with a preferred embodiment, those skilled in the art may make changes to certain features of the preferred embodiment without departing from the scope of the disclosure as defined in the appended claims. All such changes, modifications, and alterations should therefore be seen as within the scope of the disclosure.

What I claim is:

1. A rotating shaving razor apparatus comprising:

a handle having a proximal end and a distal end;

a blade-carrying head disposed at the distal end of the handle;

a rotary assembly positioned at the proximal end of the handle for elevation and depression of the handle and the blade-carrying head, wherein the rotary assembly includes a pivot rod having a first lateral end, a second lateral end, and a medial section, the medial section being retained within a channel in the handle in a transverse orientation relative to a rotational longitudinal axis of the handle, thereby defining a pivot axis about which the handle rotates; and a biasing member connected to the rotary assembly and longitudinally connected to the distal end of the handle to bias the handle from a neutral position to a shaving position.

2. The rotating shaving razor apparatus of claim 1, wherein the medial section of the pivot rod is rotatably disposed within the channel; the rotary assembly including a first securing member is fixedly attached to the first lateral end of the pivot rod and a second securing member is fixedly attached to the second lateral end of the pivot rod; and wherein the first and second securing members retain the pivot rod in a fixed position during rotational movement of the handle about the pivot axis during operation.

3. The rotating shaving razor apparatus of claim 2, wherein each securing member includes a grip portion extending outward from the handle to facilitate manual engagement.

4. The rotating shaving razor apparatus of claim 1, wherein the pivot rod is integrally molded with the handle, and the rotary assembly including a pair of securing members are rotatably attached to opposing lateral ends of the pivot rod, such that the securing members remain stationary while the pivot rod and the handle rotate together about the pivot axis during operation.

5. The rotating shaving razor apparatus of claim 4, wherein each securing member includes a grip portion extending outward from the handle to facilitate manual engagement.

6. A rotating shaving razor apparatus comprising:

a handle having a proximal end and a distal end;

a blade-carrying head disposed at the distal end of the handle;

a rotary assembly positioned at the proximal end of the handle for biasing elevation and depression of the handle and the blade-carrying head, the rotary assembly including:

a pivot rod extending transversely through a channel in the handle, the pivot rod having a first lateral end, a second lateral end, and a medial section, the medial section being retained within the channel in the handle in a transverse orientation relative to a rotational longitudinal axis of the handle, thereby defining a pivot axis about which the handle rotates;

a first securing member attached to the first lateral end of the pivot rod and a second securing member attached to the second lateral end of the pivot rod;

an elastic biasing member extending from the first securing member to the second securing member, the elastic biasing member being looped over a post disposed at the distal end of the handle, wherein the elastic biasing member provides resistance during elevation and depression of the blade-carrying head.

7. The rotating shaving razor apparatus of claim 6, wherein the pivot rod is integrally molded with the handle, and the securing members are rotatably connected at lateral ends of the pivot rod such that the securing members remain stationary while the pivot rod and the handle rotate together about the pivot axis.

8. The rotating shaving razor apparatus of claim 7, wherein each securing member includes a grip portion extending outward from the handle to facilitate manual engagement.

9. The rotating shaving razor apparatus of claim 6, wherein the pivot rod is rotatably disposed within the channel, and the securing members are fixedly connected to opposing lateral ends of the pivot rod such that both the securing members and the pivot rod remain stationary while the handle rotates about the pivot axis during operation.

10. The rotating shaving razor apparatus of claim 9, wherein each securing member includes a grip portion extending outward from the handle to facilitate manual engagement.

11. A rotating shaving razor apparatus comprising:

a handle having a proximal end and a distal end;

a blade-carrying head disposed at the distal end of the handle;

a rotary assembly positioned at the proximal end of the handle for biasing elevation and depression of the handle and the blade-carrying head, the rotary assembly including:

a pivot rod extending transversely through a channel in the handle, the pivot rod having a first lateral end, a second lateral end, and a medial section, the medial section being retained within the channel in the handle in a transverse orientation relative to a rotational longitudinal axis of the handle, thereby defining a pivot axis about which the handle rotates;

a first securing member attached to the first lateral end of the pivot rod and a second securing member attached to the second lateral end of the pivot rod;

an spring biasing member concentrically disposed around the pivot rod extending to the distal end of the handle, wherein the spring biasing member provides resistance during elevation and depression of the blade-carrying head.

12. The rotating shaving razor apparatus of claim 11, wherein the pivot rod is integrally molded with the handle, and the securing members are rotatably connected at lateral ends of the pivot rod such that the securing members remain stationary while the pivot rod and the handle rotate together about the pivot axis.

13. The rotating shaving razor apparatus of claim 12, wherein each securing member includes a grip portion extending outward from the handle to facilitate manual engagement.

14. The rotating shaving razor apparatus of claim 11, wherein the pivot rod is rotatably disposed within the channel, and the securing members are fixedly connected to opposing lateral ends of the pivot rod such that both the securing members and the pivot rod remain stationary while the handle rotates about the pivot axis during operation.

15. The rotating shaving razor of claim 11, wherein the spring biasing member is a torsion spring having a coil portion and an extended arm portion, the coil portion being positioned in compression between the handle and either the first securing member or the second securing member.

16. The rotating shaving razor of claim 15, wherein the extended arm portion is retained under tension by a catch disposed at the distal end of the handle, the catch comprises a retention notch or recessed groove formed in the handle that receives and holds the extended arm portion of the torsion spring under preload tension during operation.

17. The rotating shaving razor of claim 15, wherein the extended arm portion is embedded within the handle.

18. The rotating shaving razor of claim 11, wherein the blade-carrying head is pivotally coupled to the distal end of the handle at a secondary pivot point, wherein the blade cartridge is configured to pivot relative to the handle within a range of approximately 10 to 15 degrees during shaving.

* * * * *